United States Patent [19]
Buddruss et al.

[11] 3,838,389
[45] Sept. 24, 1974

[54] SPACE MONITORING GRADIENT SYSTEM

[75] Inventors: Claus-Peter Buddruss; Arnim Cronjaeger, both of Bremen; Karl-Friedrich Triebold, Bremen-Osterholz, all of Germany

[73] Assignee: Fried. Krupp Gesellschaft mit beschrankter Haftung, Essen, Germany

[22] Filed: Aug. 8, 1973

[21] Appl. No.: 386,732

[30] Foreign Application Priority Data
Aug. 16, 1972  Germany............................ 2240041

[52] U.S. Cl. .............................. 340/6 R, 340/16 R
[51] Int. Cl............................................... G01s 3/80
[58] Field of Search ........................... 340/6 R, 16 R

[56] References Cited
UNITED STATES PATENTS
3,319,218  5/1967  Zefting................................ 340/6 R
3,464,056  8/1969  Ziehm et al.......................... 340/6 R

*Primary Examiner*—Richard A. Farley
*Attorney, Agent, or Firm*—Spencer & Kaye

[57] ABSTRACT

A space monitoring gradient system including at least a plurality of transducers arranged to produce at least two pairs of transducers with the spacing of the transducer of each pair being less than one wavelength of the received signals produced by a noise source at the highest receivable frequency. The axes of the two pairs of transducers are perpendicular to one another with the axis of one pair being parallel to the ground and the axis of the other pair being perpendicular to the ground. A separate automatic gain control (AGC) amplifier is connected in series with the output of each of the transducers, and first and second difference circuits are provided for forming respective gradient voltage signals from the outputs from the respective AGC amplifiers of each pair of transducers. A first comparator compares the gradient voltage signal at the output of the first difference circuit, which is associated with a pair of transducers parallel to the ground, with a first settable comparison voltage and produces an "L" signal at its output whenever the output of the first difference circuit is equal to or less than the first comparison voltage. A second comparator compares the gradient voltage signal at the output of the second difference circuit with a second settable difference voltage and produces an "L" signal output whenever the output of the second difference circuit is greater than the second comparison voltage. The outputs of the first and second comparators are fed to an AND gate which produces an "L" signal at its output when an "L" signal is present at each of its inputs.

9 Claims, 11 Drawing Figures

COMPARITORS

DIFFERENTIATORS

SPACE MONITORING GRADIENT SYSTEM

BACKGROUND OF THE INVENTION

The present invention relates to a space monitoring gradient system including at least two pairs of electro-acoustical transducers with the two pairs being arranged perpendicular to one another and the two transducers of each pair are arranged at a distance from one another which is less than one wavelength of the received signals originating from a noise source at their highest receivable frequency, and with the system further including preamplifiers and AGC amplifiers connected in series with each transducer, and difference circuits for forming the gradient voltage from the output signals from the AGC amplifier associated with each pair of transducers.

It has previously been proposed to use a gradient system to determine the direction of impingement of received wave energy. For this purpose two pairs of transducers are arranged perpendicular to one another so that they enclose a square, with the diagonally opposed transducers being connected via automatic gain control (AGC) amplifiers to a difference circuit and all four transducers being connected to a sum circuit also via AGC amplifiers. The difference circuits each produce a gradient voltage of the impinging wave energy which gradient voltages are linked with the sum signal at the output of the sum circuit to determine the direction of impingement of the wave energy.

SUMMARY OF THE INVENTION

It is now the object of the present invention to use the gradient system of the above-mentioned type, not to determine the direction of impingement but rather to monitor a certain area.

The present invention is here based on the consideration that a curve of the value of the gradient voltage at one transducer pair of the gradient system takes on a minimum value when a planar wavefront of the impinging wave energy lies parallel to an axis which is the extended connection between the two transducers, and thus reaches the transducers simultaneously. The gradient voltage has a higher value the higher the angle between the axis and the wavefront and approaches a maximum when the wavefront is perpendicular to the axis, i.e. when the direction of impingement of the wavefront is the same as the direction of the axis. This behavior of the gradient voltage is utilized in that, in contradistinction to the use of a gradient system for determining the direction of impingement, the gradient voltages at two pairs of transducers are now individually evaluated, without any linkages.

According to the present invention this is accomplished in that a plurality of transducers are arranged to form at least two pairs of transducers whose axes are perpendicular and with one pair of transducers having its axis parallel to the ground and the other pair having its axis perpendicular to the ground. A first comparator or comparison circuit is provided which has a settable first comparison voltage and which is series-connected to a first difference circuit which itself is connected, via respective AGC amplifiers, with the two transducers whose axis is arranged parallel to the ground. This first comparator produces at its output a signal "L" whenever the value of the first gradient voltage at the output of the first difference circuit is equal to or less than the first comparison voltage. A second comparison circuit with a second settable comparison voltage is series connected to a second difference circuit which itself is connected via respective AGC amplifiers with the two transducers whose axis is arranged perpendicular to the ground. This second comparison circuit produces a signal "L" at its output whenever the value of the second gradient voltage at the output of the second difference circuit is greater than the second comparison voltage. Finally the output of the first and second comparison circuits are connected to respective inputs of a first AND gate which produces a signal "L" at its output whenever the signal "L" is present at the outputs of the first and second comparison circuits.

According to a first embodiment of the invention, four transducers disposed in a single plane perpendicular to the ground are arranged to form the two pairs of transducers.

If a waterway is to be monitored the transducer is placed on the ground, i.e. at the bottom of the waterway or in some other way, for example, by attaching same to an anchored floating body at a known depth, so that the first pair of two transducers, in this case hydrophones, is arranged parallel to the longitudinal direction of the waterway and the second pair of two phydrophones is arranged perpendicular to the longitudinal direction and perpendicular to the ground. Then the normal of the plane enclosed by the four hydrophones is parallel to the ground or to the surface of the water, respectively. The extended connection, between the hydrophones of the first pair, i.e. the axis of this pair, is the $x$ axis parallel to the longitudinal direction of the waterway, and the extended connection between the hydrophones of the second pair is the $z$ axis which is perpendicular to the ground and to the $x$ axis.

By setting the second comparison in the second comparison circuit the radius of a circle about $z$ axis is defined. If the water vehicle is disposed within this circle, the second comparison circuit emits the signal "L" since the amount of the second gradient voltage at the output of the second difference circuit is then greater than the value of the second comparison voltage. By setting the first comparison voltage in the first comparison circuit, a distance from the $z$ axis is defined by a hyperbolic curve which perpendicularly intersects the $x$ axis in a first approximation. If the water vehicle passes over this hyperbolic curve in an approximation to the $z$ axis, the first comparator emits its "L" signal since then the amount of the first gradient voltage at the output of the first difference circuit is less than the first comparison voltage. The first comparison voltage is preferably so selected that the distance is less than the radius. If the water vehicle on its waterway approaches the $z$ axis and passes over this hyperbolic curve within the circle, then it is disposed within a distance from the gradient system at which the first AND gate emits a signal since now the second comparison circuit as well as the first comparison circuit have the "L" signal at their outputs. The signal at the output of the first AND gate is used, for example, to switch on and off warning signal generators such as a whistling buoy or a visual marker for obstacles in the vicinity of the waterway.

An advantage for the use of the gradient system according to the present invention is that the warning signal generator will be switched on only when a water vehicle comes too close to a warning zone so that location of the warning signal generator on the part of the water vehicle, for example, during fog, is simplified and the energy consumption of the warning signal generator itself is greatly reduced.

A further advantage of the use of a gradient system according to the present invention is that the switching criterion is derived independently of the intensity of the acoustic wave energy emitted by the water vehicle. Thus any vehicle, whether it has a low or loud traveling noise, is safely warned since merely the geometric position of the water vehicle with reference to the gradient system is evaluated. Otherwise, with the known intensity dependent switching criteria, a water vehicle with a very loud travelling noise would switch on the warning system unnecessarily much earlier than would a vehicle which is quieter.

According to a further embodiment of the present invention the space monitoring gradient system additionally employs a further pair of transducers disposed on the y axis in a plane parallel to the ground and perpendicular to the x axis. This third pair also has respective AGC amplifiers and a third difference circuit connected in series to form a third gradient voltage. This third gradient voltage is compared as to its value with a third settable comparison voltage in a third comparison circuit which emits an "L" signal whenever the amount of the third gradient voltage is less than the third comparison voltage. This signal at the output of the third comparison circuit is then also connected to a respective input of the first AND gate.

By setting of the first and third comparison voltages, a cushion-type area is outlined whose area is preferably equal to the area of the above mentioned circle. For the warning signal generator to be switched on, three switching criteria must now be met: the gradient voltage from one of the pairs of transducers arranged parallel to the ground must have a lesser value than the settable first comparison voltage, the gradient voltage from the other pair must be less than the set second comparison voltage and the value of the gradient voltage of the pair disposed perpendicular to the ground must also be greater than the set second comparison voltage.

The advantage of a space monitoring gradient system with three-dimensionally disposed pairs of transducers is that it is more redundant than a system including, for example, only a single perpendicularly disposed pair of transducers since it has been found in practice that the maximum of the value of the gradient voltage of the perpendicularly disposed pairs is not so clearly defined that, especially in shallow water, different propagation conditions could not produce noticeable changes in the curve of the value of this gradient voltage. Since with the same area of the circle and the cushion-type area the corner tips of the cushion-type area are cut off by the area of the circle, the remaining area in which the first AND gate emits its signal is almost circular so that the distance of its outline is practically the same with each approach of the water vehicle in the direction toward the z axis. This space monitoring gradient system can thus be used with advantage not only as a warning device about danger zones in waterways but also in areas where the water vehicle can approach the gradient system from any desired direction since the area in which all three switching criteria are met is almost circular. For example, the space monitoring system can be used with advantage as a warning in front of a reef or a wreck. When only two pairs of transducers are used which are arranged parallel to the ground, the requirement of a practically constant distance from the gradient system would not be met as a criterion for switching on the warning signal generator since the distance in the direction of the diagonal of the cushion-type area is substantially greater than that toward the sidelines.

According to a further embodiment of the present invention the increase in the path or time dependent curve of the values of the three gradient voltages is evaluated. Within the area given by the first, second and third comparison voltages, a check is made in a check stage, two comparison stages and a logic circuit, as to whether the first derivative of the curves of the amount of the second gradient voltage originating from the pair of transducers disposed perpendicular to the ground with respect to time is greater than or equal to zero or whether the first derivative of the curves of the values of the first and third gradient voltages originating from the two pairs of transducer disposed parallel to the ground with respect to time is less than or equal to zero. As long as these switching criteria are met and the water vehicle is disposed in a given area, the warning signal generator is in operation. Only when the water vehicle moves away from the space monitoring gradient system, is the sign of the first derivative of the curves of the values of the three gradient voltages with respect to time reversed and the warning signal generator is switched off since a warning is now no longer required, or a second warning signal is emitted which is transmitted until the water vehicle has moved out of the danger zone.

The space monitoring gradient system according to the present invention can be used not only in the field of the sonar art for monitoring waterways, but can also be used, when it is supplied with microphones, for propagation of sound through air, for example in monitoring landing strips or in other traffic monitoring problems.

DETAILED DESCRIPTION OF THE PREFERRED EMBODIMENTS

Figure 1:
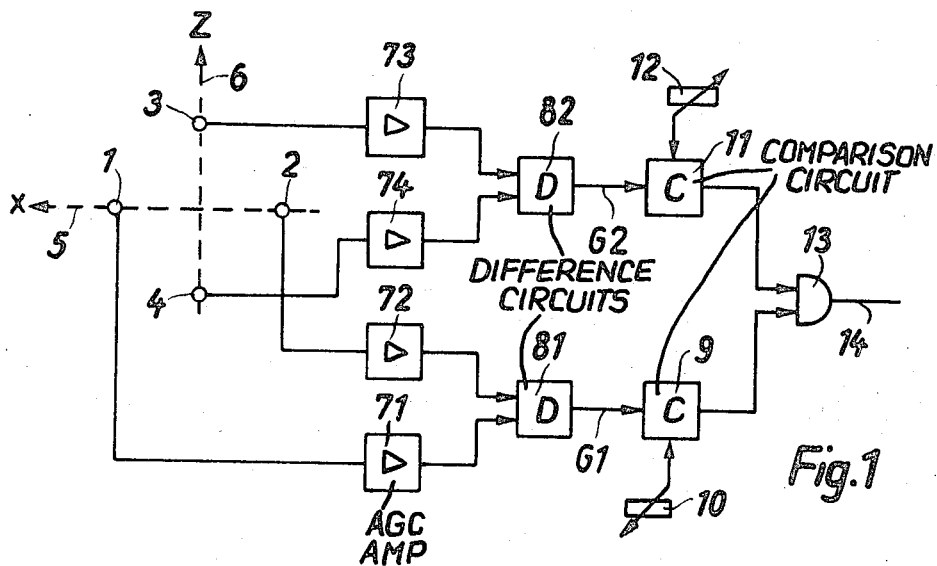
FIG. 1 is a block circuit diagram for a space monitoring gradient system according to the present invention consisting of two pairs of transducers each having two separate transducers.
Figure 2:
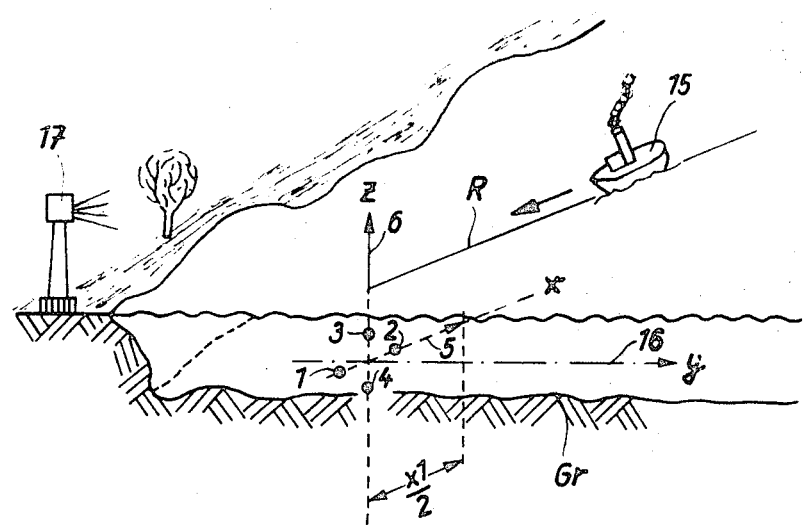
FIG. 2 is a pictorial view of a use of the embodiment of the space monitoring gradient system of FIG. 1.

FIG. 1 shows a gradient system including four transducers intended to monitor a waterway with four hydrophones 1, 2, 3, 4. The hydrophones 1 and 2 form a pair disposed on an $x$ axis 5. Hydrophones 3 and 4 are disposed on a $z$ axis 6 and form the second pair of the gradient system. As shown in FIG. 2, the gradient system, i.e., hydrophones 1–4, is arranged so that the $x$ axis 5, i.e., hydrophones 1 and 2, is parallel to the longitudinal direction R of the waterway and simultaneously parallel to the bottom or ground Gr, while hydrophones 3 and 4 on the $z$ axis 6 are arranged perpendicularly to the longitudinal direction R of the waterway and to the bottom Gr. The hydrophones 1 and 2 are connected via respective automatic gain control (AGC) amplifiers 71, 72 with a first difference circuit 81, which is connected in series with a comparator or comparison circuit 9 to which is also applied a settable comparison voltage 10. The hydrophones 3 and 4 are also connected, via respective AGC amplifiers 73, 74 with a second difference circuit 82 which is connected in series with a comparison circuit 11 to which is also applied a settable voltage value or comparison voltage 12. The outputs of comparator 9 and the comparator 11 are connected in series with a respective input of an AND gate 13 at whose output a signal 14 can be obtained.

Figure 3:
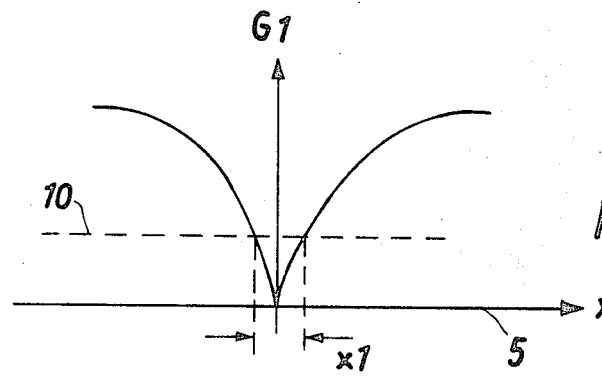
FIG. 3 shows the curve of the values of a gradient voltage between two transducers of a pair as a function of a path, the path extending in the direction toward the axis between the two transducers of the pair.

In order to monitor a waterway whose longitudinal direction R is disposed at a distance in the direction of the $z$ axis 6 and parallel to the $x$ axis 5, as shown in FIG. 2, a noise source, i.e., a water vehicle 15, moves toward the gradient system and passes over the gradient system. FIG. 3 shows the curve for the value of a first gradient voltage G1 at the output of the difference circuit 81 which curve is produced by the water vehicle 15 on its path parallel to the $x$ axis 5. If the water vehicle 15 moves toward the $z$ axis 6, the value of the first gradient voltage G1 at the output of the difference circuit 81 continuously decreases from an initial maximum value. When the water vehicle 15 intersects the $z$ axis 6 and is disposed between the two hydrophones 1 and 2, the received signals at the two hydrophones 1 and 2 are identical in value and the value of the first gradient voltage G1 at the output of the difference circuit 81 is zero. If the water vehicle 15 moves over the $z$ axis 6 and away from the gradient system, the value of the first gradient voltage G1 at the output of the difference circuit 81 increases again and reaches its maximum value when the water vehicle 15 is far away.

Figure 4:
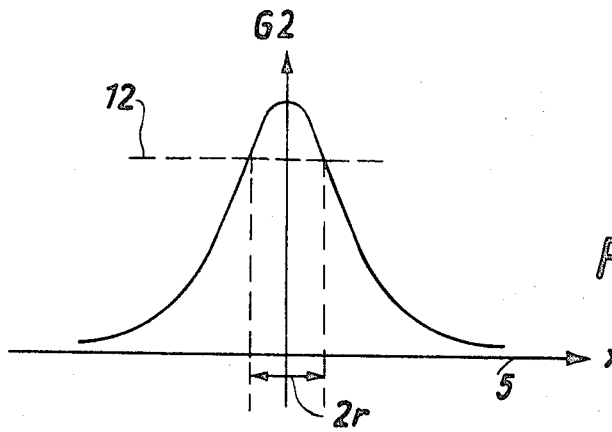
FIG. 4 shows a curve of the value of a gradient voltage between the two transducers of a vertically oriented pair as a function of a horizontally oriented path, the direction of the path extending perpendicularly to the axis between the transducers of the pair.

FIG. 4 shows the curve of the value of the second gradient voltage G2 at the output of the difference circuit 82 as a function of the path traversed by the water vehicle 15. If the water vehicle 15 is far away from the gradient system, the value of the second gradient voltage G2 at the output of the difference circuit 82 is very small. It increases when the water vehicle 15 moves toward the $z$ axis 6 from any desired direction and reaches it maximum value when the water vehicle 15 is disposed directly above the gradient system on the $z$ axis 6. Upon passing over the $z$ axis 6 the value of the second gradient voltage G2 at the output of the difference circuit 82 decreases again.

Figure 5:
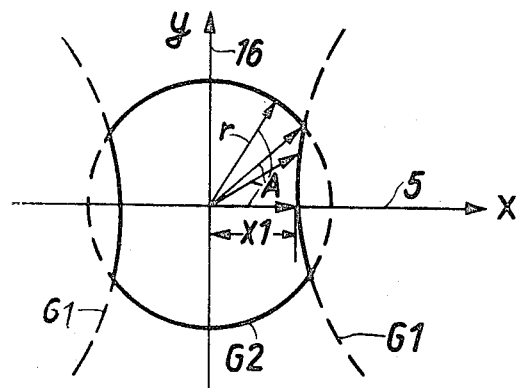
FIG. 5 is a view in an $x$, $y$ plane of lines of the same value as the curves shown in FIGS. 3 and 4.

By setting the voltage value 12 in the comparison circuit 11, a circle is defined about the $z$ axis which has a radius $r$ and which lies parallel to the bottom Gr in an $x$–$y$ plane formed by the $x$ axis 5 and a perpendicularly disposed $y$ axis 16. If the water vehicle 15 enters this circle, the signal "L" appears at the outupt of the comparison circuit 11. The comparison voltage 10 in the comparator 9 defines a distance $2 \cdot X1$ on the $x$ axis 5 which lies between two hyperbolic curves in the $x$–$y$ plane, as shown in FIG. 5. The hyperbolic lines lie symmetrically to the $y$ axis 16 and show the locations in the $x$–$y$ plane at which the amount of the first gradient voltage G1 is constant and equal to the comparison voltage. In order to increase the redundancy the distance $2 \cdot X1$ is preferably selected to be less than twice the radius $r$. The hyperbolic curves cut circular segments out of the circle.

If the water vehicle 15 moves on its waterway in the longitudinal direction R parallel to the $x$ axis 5, the signal "L" appears at the output of the comparison circuit 11 when the water vehicle 15 has entered the circle with the radius $r$, since the amount of the second gradient voltage G2 is greater than the comparison voltage 12. At the output of comparator 9 signal "L" appears only when the water vehicle 15 has also reached or passed over the hyperbolic curve, for example, the distance $x$ on the $x$ axis 5, since then the amount of the first gradient voltage G1 is exactly equal to or less than the comparison voltage 10. With the hyperbolic curves and the periphery of the circle a distance A is thus defined, the passage over which by the water vehicle causes the AND gate 13 to emit signal 14. If the water vehicle is within the area defined at distance A by the $x$ axis 5 and which is shown in FIG. 5 with a solid line, the AND gate 13 emits the signal 14 since the comparison circuits 9 and 11 each provide the signal "L" at their respective outputs.

If the water vehicle 15 is within distance A, a warning signal generator 17 (FIG. 2) is switched on, for example, by the signal 14 to warn the water vehicle 15 about banks or other obstacles in the vicinity.

If the water vehicle has moved away from the longitudinal direction R in the direction of the $y$ axis 16 by more than radius $r$, the value of the first gradient voltage G1 at the output of the difference circuit 81 falls below the comparison voltage 10 when the water vehicle 15 moves past the gradient system parallel to the $x$ axis 5. The amount of the second gradient voltage G2 at the output of the difference circuit 82, however, does not reach the value of the comparison voltage 12 and thus no signal 14 is emitted by AND gate 13, since the water vehicle 15 has not come closer to the $z$ axis 6 by the distance A and a signal "L" appears only at the output of comparator 9 and not at the output of comparator circuit 11. A warning is not necessary in this case because the water vehicle 15 is still located outside of the danger zone.

Figure 6:
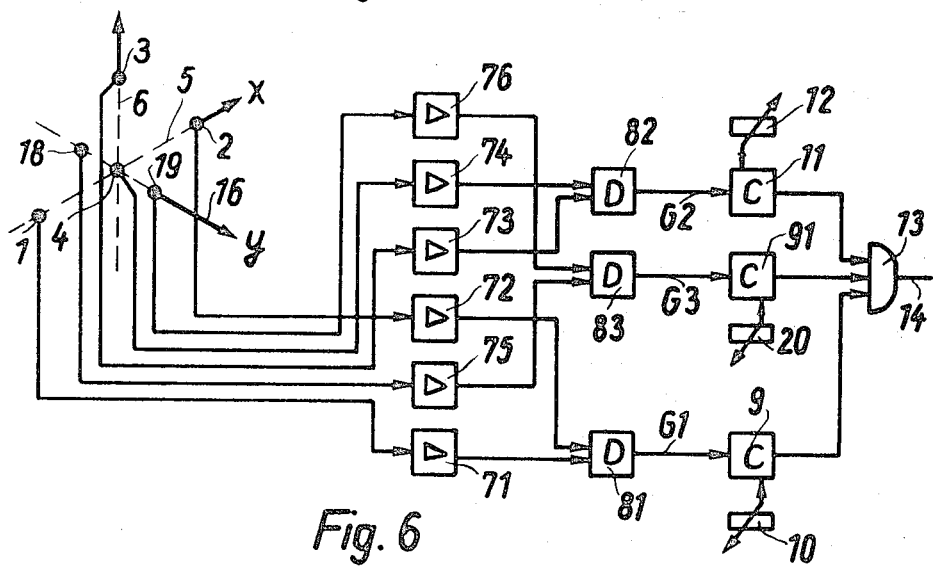
FIG. 6 is a block circuit diagram for a further embodiment of the space monitoring gradient system according to the invention utilizing three pairs of transducers each having two separate transducers.

FIG. 6 shows a space monitoring gradient system according to the present invention which consists of three pairs of transducers, for example hydrophones 1, 2, 3, 4, 18 and 19. These three pairs of transducers define two planes which are perpendicular to one another and lie in a coordinate system $x, y, z$. In this coordinate system hydrophones 1 and 2 are disposed on the $x$ axis 5, hydrophones 3 and 4 are disposed on the $z$ axis 6, and hydrophones 18 and 19 are disposed on the $y$ axis 16. As in the embodiment of FIG. 1, hydrophones 1 and 2 are connected with the difference circuit 81 via AGC respective amplifiers 71 and 72, and hydrophones 3 and 4 are connected with the different circuit 82 via respective AGC amplifiers 73 and 74. The hydrophones 18 and 19 are connected to a further difference circuit 83, via respective AGC amplifiers 75 and 76. The outputs of the three difference circuits 81, 82, 83 form the values of the three gradient voltages G1, G2, G3. As described for FIG. 1, the first and second gradient voltages G1, G2 appearing at the output of the difference circuit 81 and 82 respectively are fed respectively to comparison circuits 9 and 11 whose outputs are connected to respective inputs of the AND gate 13. The output of the third difference circuit 83 is also connected with a comparison circuit 91 to which is additionally fed a settable comparison voltage 20. Thee comparison voltage 20 can be set independently of the comparison voltages 10 and 12. The output of the comparison circuit 91 is connected to a further input of the AND gate 13 and produces a signal "L" only when the third gradient voltage G3 has a smaller value than the comparison voltage 20.

At the output of the AND gate 13 signal 14 thus appears when the first gradient voltage G1, as a value falls below a given comparison voltage 10, the third gradient voltage G3 at the output of the difference circuit 83, as a value, also falls below the comparison voltage 20, and furthermore the second gradient voltage G2, as a value exceeds the comparison voltage value 12.

The comparison circuits 9, 11 and 91 are, for example, Schmitt triggers with a settable threshold, or appropriately connected operational amplifiers which are commercially available as intergrated circuits.

Figure 7:
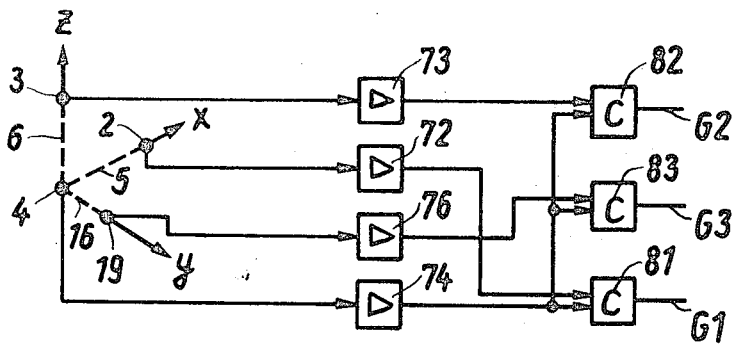
FIG. 7 is a partial block circuit diagram of a further embodiment of the space monitoring gradient system according to the invention wherein four transducers are arranged to form three pairs of transducers.

FIG. 7 shows an arrangement of a space monitoring gradient system comprising only four transducers which form three pairs of transducers. In coordinate system $x, y, z$ hydrophone 4 is disposed at the origin of the system and hydrophones 2, 3 and 19 are each arranged at the same distance from the origin on the $x$ axis 5, the $y$ axis 16 and the $z$ axis 6, respectively.

In order to form the values of the three gradient voltages G1, G2, G3, the three hydrophones 2, 3, and 19 on the three axes 5, 6, 16 of the coordinate system $x, y, z$ are each connected via respective AGC amplifiers 72, 73 and 76 with one input of a respective difference circuit 81, 82 or 83. The still unconnected inputs of the three difference circuits 81, 82, 83 are connected together and, via AGC amplifier 74, are connected with the hydrophone 4 at the origin of the coordinate system $x, y, z$. The values of the three gradient voltages G1, G2, G3 can thus be obtained at the outputs of the three difference circuits 81, 82, 83. Although not shown, as in the embodiment of FIG. 6, the outputs of the difference circuits 81, 82 and 83 are connected to the comparison circuits 9, 11 and 91, respectively.

Figure 8:
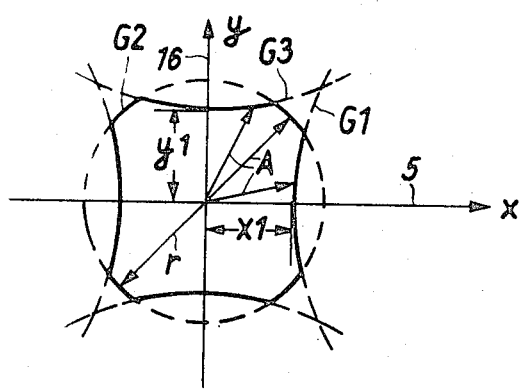
FIG. 8 is an expanded view of FIG. 5.

FIG. 8 is a diagram in the $x, y$ plane with the value of the first gradient voltage G1 being shown as a circle whose radius $r$ is equal to the comparison voltage 10, and the value of the second gradient voltage G2, which is equal to the comparison voltage 12, and the value of the third gradient voltage G3, which is equal to the comparison voltage 20, being shown as hyperbolic curves. The comparision voltage 10 and the comparison voltage 20 are so selected that they define distances $x1$ and $y1$ which are less than radius $r$. The hyperbolic curves enclose a cushion-type area selected to be approximately equal to the area of the circle having radius $r$. The circle cuts off the corner tips of the cushion-type area so that now an area is given whose outline has the distance A from the coordinate origin, this distance A being almost constant. In order to produce signal 14 at the output of the AND gate 13, a water vehicle 15 must be located within this area.

The advantage of the expanded space monitoring gradient system with three pairs of transducers is that this system has a similar characteristic to a system employing only two transducers which are perpendicular to the ground, but is substantially more redundant. In every space monitoring system it is desired that the outline of the area, the entrance into which causes the warning signal generator 17 to be actuated, be symmetrical with the $z$ axis. This symmetry is provided in a good approximation by the space monitoring gradient system employing three pairs of transducers, where three criteria are required to produce the signal 14 at the output of the AND gate 13. If only one pair of transducers were employed, slight fluctuations in the transmission behavior of the medium would suffice to vary the radius $r$ to such a degree that a warning signal would be issued too early or too late since the maximum of the value of the second gradient voltage G2 is not very well defined. If only the values of the first and third gradient voltages G1, G3 were selected as applicable criteria, the required symmetry would not be maintained since the distance between the origin of the coordinate system in the $x, y$ plane and the four corner points of the cushion-type area is substantially greater than the distances $x1$ and $y1$.

Figure 9:
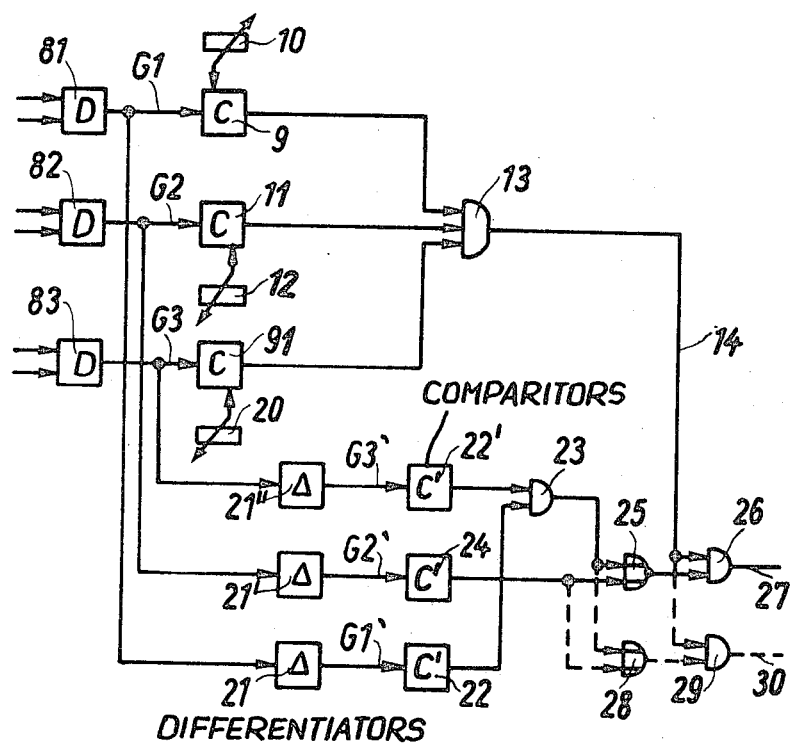
FIG. 9 is an expanded block circuit diagram for an arrangement of transducers according to FIGS. 6 or 7 showing a further modification according to the invention.

FIG. 9 shows a modification of the block circuit diagram of FIG. 6. The three pairs of transducers are assumed to be arranged as shown in FIGS. 6 or 7. The values of the three gradient voltages G1, G2, G3 at the outputs of the three difference circuits 81, 82, 83 are evaluated, on the one hand, as shown in connection with FIG. 6 and, on the other hand, they are additionally each differentiated according to time in the three differentiating stages 21, 21' and 21''. The values of the first and third gradient voltages G1, G3 obtained from the difference circuits 81 and 83, respectively, are fed, via differentiating stages 21 and 21' respectively to a respective comparision stage 22 and 22'. The two comparison stages 22 and 22' each emit a signal "L" only when their respective input signal is greater than or equal to zero. The outputs of the two comparison stages 22 and 22' are connected to respective inputs of an AND gate 23.

If a water vehicle 15 moves toward the space-monitoring gradient system, the rise in the curve of the amounts of the first and third gradient voltages G1, G3 of the two pairs of transducers at the bottom is negative as shown in FIG. 3. Only when the water vehicle 15 changes its direction of travel and moves at a constant distance to the gradient system so that the rise and thus the time differentiated curves of the amounts of the first and third gradient voltages G1', G3' become zero or positive when the water vehicle 15 moves away, will the two comparison stages 22 and 22', and consequently the AND gate 23, each emit a signal "L".

The difference circuit 82 which provides the value of the second gradient voltage G2, is connected with a check or further comparison stage 24 via differentiating stage 21'. A signal "L" appears at the output of the check stage 24 only when the time differentiated curve of the value of the second gradient voltage G2' is negative or equal to zero. As shown in FIG. 4, the value of the second gradient voltage G2 will always increase as long as the water vehicle 15 approaches the gradient system. The time differentiated curve of the value of the second gradient voltage G2' is thus always positive and only when the water vehicle 15 is disposed directly above the gradient system and the value of the second gradient voltage G2 is at its maximum is the slope equal to zero. The slope becomes negative when the water vehicle 15 moves away from the space monitoring gradient system. The check stage 24 emits a signal "L" at its output only when the differentiated curve of the amount of the second gradient voltage G2' is less than or equal to zero.

The output of the check stage 24 is connected with one input of a NOR gate 25 whose second input is connected with the output of the AND gate 23. At the output of the NOR gate 25 a signal "L" thus appears only if neither the AND gate 23 nor the check stage 24 emit a signal "L", i.e., neither the time differentiated curve of the value of the second gradient voltage G2' is less than or equal to zero, nor the time differentiated curves of the values of the first and third gradient voltages G1', G3' are greater than or equal to zero. At the output of the NOR gate 25, a signal "L" will thus appear only as long as the water vehicle 15 moves toward the gradient system.

The output of NOR gate 25 is connected with one input of a further AND gate 26 whose second input is connected with the output of the AND gate 13. At the output of the AND gate 26 a signal 27 will thus appear only when the water vehicle 15 is moving toward the gradient system within the area defined by the signal 14 at the output of the AND gate 13.

If the water vehicle 15 moves away from the gradient system, signal 27 disappears since then the slopes in the curves of the values of the three gradient voltages G1', G2', G3' change their sign and the AND gate 23 and/or the check stage 24 emit a signal "L" so that no signal "L" appears at the output of NOR gate 25.

Signal 27 at the output of the AND gate 26 is advantageously suited to control a warning signal generator 17 which warns the water vehicle 15 about a reef or wreck. The warning signal generator 17 is in operation only as long as the water vehicle moves toward the gradient system installed at the wreck and is switched off when the water vehicle 15 has changed its course, since now the water vehicle 15 is moving out of the danger zone.

Figure 10:
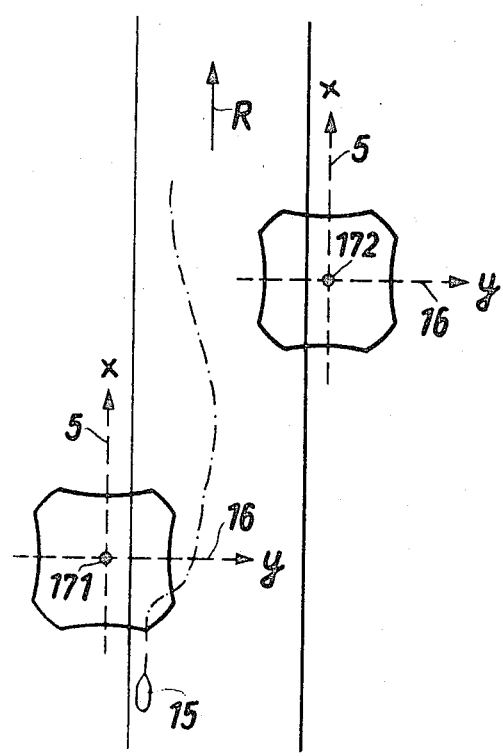
FIG. 10 illustrates the operation of an embodiment of a space monitoring gradient system according to FIG. 9.

FIG. 10 in connection with FIG. 9 shows a further embodiment for the space monitoring gradient system according to the present invention. In the illustration of FIG. 10, the path of a water vehicle 15 through a waterway is prevented by two wrecks at the edge of the waterway. Both wrecks are equipped with a space monitoring gradient system each with series connected warning signal generator 171, 172. In such case the circuit of FIG. 9 as described above is used with the addition that there is provided an OR gate 28 whose inputs are connected with the outputs of the second AND gate 23 and the check stage 24, and a further AND gate 29 whose inputs are connected to the outputs of the OR gate 28 the outputs of the AND gate 13.

At the output of the AND gate 29 there appears a signal 30 when the water vehicle 15 is moving away from the gradient system within the area defined by signal 14 since then the OR gate 28 and the AND gate 13 each emit a signal "L." Signal 27 and signal 30 control the warning signal generators 171 or 172, respectively. When the water vehicle 15 moves over the distance A from the gradient system and approaches it, signal 27 is emitted by the AND gate 26 since the slopes in the curves of the valves of the first and third gradient voltages G1', G3' are negative and the slope in the curve of the value of the second gradient voltage G2' is positive. The warning signal generator 171 transmits its first warning signal. If the water vehicle 15 now changes its course and moves away from the gradient system in order to leave the danger zone, a signal "L" appears at the output of OR gate 28 since the time differentiated curves of the values of the first and third gradient voltages G1', G3' are zero or positive or the differentiated curve of the value of the second gradient voltage voltage G2' is zero or negative. As long as the water vehicle 15 is still in the area in which signal 14 is present at the output of the AND gate 13, signal 30 is present at the output of the AND gate 29 and controls the warning signal generator 171 to emit a second warning signal. The water vehicle 15 is guided by the second warning signal of the warning signal generator 171 until it has left the danger zone.

Figure 11:
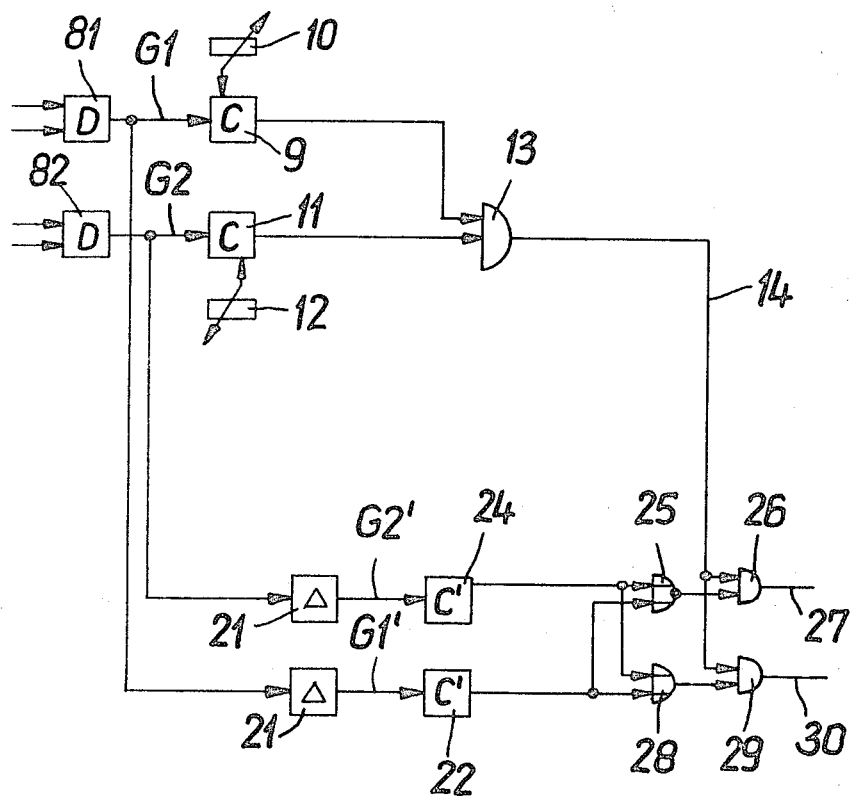
FIG. 11 is an expanded block circuit diagram for an arrangement of transducers according to FIG. 1 showing a further modification according to the invention.

This type of evaluation of the values of the gradient voltages is also possible, according to the present invention, when a space monitoring gradient system having only two pairs of four hydrophones 1, 2, 3, 4 is employed as shown in FIG. 1. In this case as shown in FIG. 11, the signal 14 at the output of the AND gate 13 is then generated in the manner described in connection with FIG. 1. The differentiated curves of the values of the first and second gradient voltages G1', G2' are produced, via differentiating stages 21 and 21' as shown in FIG. 11 and are fed to the comparison stage 22 and the check stage 24 whose outputs are connected directly to the NOR gate 25 and the OR gate 28. Signal 14 and the signal at the output of the NOR gate 25 act on the AND gate 26 and produce signal 27, while signal 14 and the signal at the output of OR gate 28 act on the AND gate 29 and produce signal 30.

It will be understood that the above description of the present invention is susceptible to various modifications, changes and adaptations, and the same are intended to be comprehended within the meaning and range of equivalents of the appended claims.

We claim:

1. A space monitoring gradient system including: a plurality of electroacoustical transducers which are arranged to form at least two pairs of transducers whose axes are perpendicular to one another and with the spacing between the two transducers of each pair being less than one wavelength of the received signals originating from a noise source at their highest receivable frequency, a first of said pairs of transducers having its axis parallel to the ground and a second of said pairs of transducers having its axis disposed perpendicular to the ground; a plurality of automatic gain control amplifiers each of which is connected in series with the output of a respective one of said transducers; a first difference circuit means, having its inputs connected to the outputs of the two of said automatic gain control amplifiers which are associated with the transducers of said first pair of transducers, for providing a first gradient voltage signal at its output; a first comparator means, connected in series with said first difference circuit means, for comparing said first gradient voltage signal with a first settable comparison voltage and for providing a signal "L" at its output whenever said first gradient voltage is equal to or less than said first settable comparison voltage; a second difference circuit means, having its inputs connected to the outputs of the two of said automatic gain control amplifiers which are associated with the transducers of said second pair of transducers, for providing a second gradient voltage signal at its output; a second comparator means, connected in series with said second difference circuit means, for comparing said second gradient voltage signal with a second settable comparison voltage and for providing an "L" signal at its output whenever said second gradient voltage signal is greater than said second comparison voltage; and a first AND gate, having a respective input connected to the output of each of said first and second comparator means, said first AND gate providing an "L" signal at its output when an "L" signal is present at each of its inputs.

2. A space monitoring gradient system as defined in claim 1 wherein there are four transducers disposed in a single plane perpendicular to the ground and forming said two pairs of transducers whose axes are perpendicular to one another.

3. A space monitoring gradient system as defined in claim 1 wherein said first and second pairs of transducers are disposed in a single plane perpendicular to the ground and further comprising: a third of said pairs of transducers, said third pair of transducers being disposed with its axis normal to said single plane; a third difference circuit means, having its inputs connected to the outputs of the two of said automatic gain control amplifiers which are associated with the transducers of said third pair of transducers, for providing a third gradient voltage signal at its output; and, a third comparator means, connected in series with said third difference circuit means, for comparing said third gradient voltage signal with a third settable comparison voltage and for providing an "L" signal at its output whenever said third gradient voltage signal is equal to or less than said third comparison voltage, the output of said third comparator means being connected to a further respective input of said first AND gate.

4. A space monitoring system as defined in claim 3 wherein said first and second pairs of transducers are formed by four transducers disposed in a single plane perpendicular to the ground, and said third pair of transducers is formed by a fifth and a sixth transducer.

5. A space monitoring gradient system as defined in claim 3 wherein said first, second and third pairs of transducers are formed by four of said transducers which define two planes which are perpendicular to one another in that one of said transducers is disposed at the origin of a three-dimensional, rectangular coordinate system and each one of the three other of said transducers is disposed at the same distance from said origin on one of said three coordinate axes, whereby each of said transducers on one of the coordinate axis forms a respective one of said pairs of transducers with the one of said transducers at said origin of said coordinate system.

6. A space monitoring gradient system as defined in claim 3 further comprising: first, second and third differentiating circuits connected to the outputs of said first, second and third difference circuit means, respectively, for providing output signal corresponding to the time differentiated curves of said first, second and third gradient voltages respectively; fourth and fifth comparator means, connected to the outputs of said first and third differentiating circuits respectively, for providing "L" signals at their respective outputs whenever the respective time differentiated curve of the associated gradient voltage is greater than or equal to zero; a sixth comparator means, connected to the output of said second differentiating circuit for providing an "L" signal at its output whenever the time differentiated curve of said second gradient voltage is less than or equal to zero; a second AND gate having its two inputs connected respectively to the outputs of said fourth and fifth comparator means; a NOR gate having its two inputs connected respectively to the outputs of said second AND gate and said sixth comparator means; and a third AND gate having its two inputs connected respectively to the outputs of said NOR gate and said first AND gate.

7. A space monitoring gradient system as defined in claim 6 further comprising an OR gate having its two inputs connected respectively to the output of said second AND gate and the output of said sixth comparator means; and a fourth AND gate having its two inputs connected respectively to the output of said OR gate and the output of said first AND gate.

8. A space monitoring gradient system as defined in claim 2 further comprising first and second differentiating circuits connected to the outputs of said first and second comparator means respectively for providing output signals corresponding to the time differentiated curves of said first and second gradient voltages respectively; a third comparator means connected to the output of said first differentiated circuit for providing an "L" signal at its output whenever the time differentiated curve of said first gradient voltage is greater than or equal to zero; a fourth comparator means connected to the output of said second differentiating circuit for providing an "L" signal at its output whenever the time differentiated curve of said second gradient voltage is less than or equal to zero; a NOR gate having its two inputs connected respectively to the outputs of said third and fourth comparator means; and a second AND gate having its two inputs connected respectively to the outputs of said NOR gate and said first AND gate.

9. A space monitoring gradient system as defined in claim 8 further comprising an OR gate having its two inputs connected respectively to the outputs of said third and fourth comparator means; and a third AND gate having its two inputs connected respectively to the outputs of said OR gate and said first AND gate.

* * * * *